P. M. ENGELHARDT.
FOLDING STEP.
APPLICATION FILED JUNE 12, 1912.
1,061,828. Patented May 13, 1913.
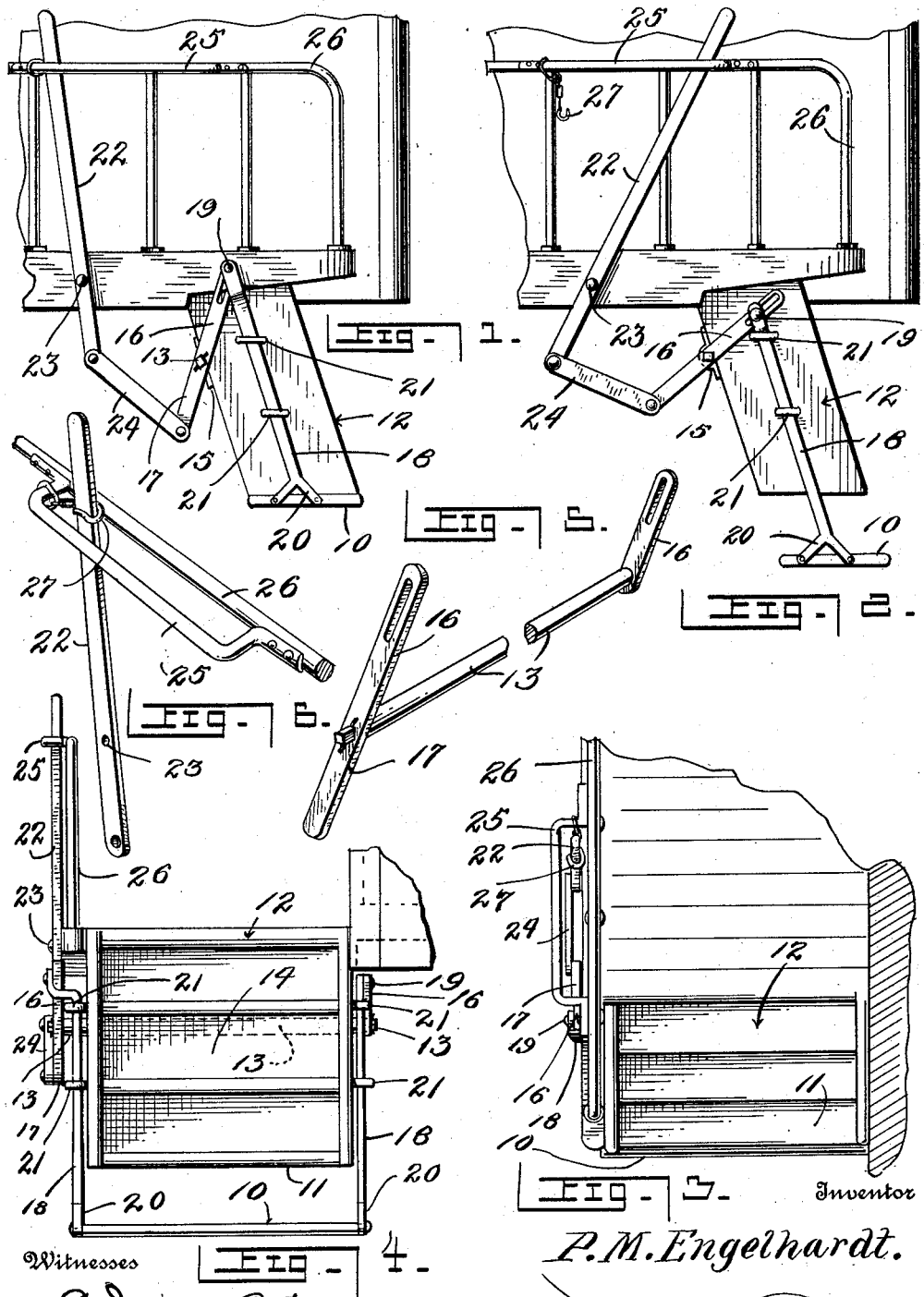
Witnesses
C. J. mac Carter
Francis Boyle
Inventor
P. M. Engelhardt.
By
Attorney
COLUMBIA PLANOGRAPH CO., WASHINGTON, D. C.

UNITED STATES PATENT OFFICE.

PHILIP M. ENGELHARDT, OF SWALEDALE, IOWA.

FOLDING STEP.

1,061,828. Specification of Letters Patent. Patented May 13, 1913.

Application filed June 12, 1912. Serial No. 703,282.

*To all whom it may concern:*

Be it known that I, PHILIP M. ENGELHARDT, a citizen of the United States, residing at Swaledale, in the county of Cerro Gordo, State of Iowa, have invented certain new and useful Improvements in Folding Steps; and I do hereby declare the following to be a full, clear, and exact description of the invention, such as will enable others skilled in the art to which it appertains to make and use the same.

This invention relates to extension car steps of that general class designed to be projected into operative position when required and to be returned to normal position out of the way when not required.

An object of the present invention is to provide a novel operating lever for the step, with means for locking the lever in position to hold the step out of the way in normal position.

A further object of the invention is to provide a novel crank shaft which is operatively connected to the lever and which is provided at the opposite ends with hanger rods which support the step, the shaft being adapted to be concealed in rear of the stationary steps, a slight rotation of this shaft in either direction serving to raise or lower the step to concealed or operative position below the bottom tread of the stationary steps.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of my improved device in operative position. Fig. 2 is a side elevation of the device in released position. Fig. 3 is a plan view of the parts shown in Fig. 1. Fig. 4 is a front elevation of the parts shown in Fig. 1. Fig. 5 is a detail perspective view of the crank shaft. Fig. 6 is a detail perspective view of the operating lever and locking means therefor.

Referring now to the drawing in which like characters of reference designate similar parts, 10 designates the extension step which is in the nature of a single tread designed to be applied to a passenger car or coach and adapted to be arranged below and in spaced relation to the bottom tread 11 of the lowermost car step 12. The step 10, as illustrated in Fig. 1 forms a continuation of the car steps when in operative position and when in normal position bears against the bottom face of and is concealed beneath the tread 11 of the lowermost car step as shown in Fig. 2.

For shifting the step 10 to operative and released positions I provide a crank shaft 13 which is secured transversely across the rear face of one of the car step risers 14 through the instrumentality of staples 15 or similar bearings, the crank shaft being equipped at the opposite ends with upturned crank arms 16, and being further equipped at one end with a crank arm 17 extending downwardly from and in alinement with the crank arm of said end. Hanger rods 18 are pivotally connected at their upper ends as shown at 19 to the crank arms 16 and are equipped at the lower ends with branches 20 which are fixed to the edges of the step 10. Guide staples 21 or similar guide members are straddled over the rods and engaged in the edges of one of the risers of the car steps.

An operating lever 22 is pivotally connected near the lower end to the car platform as shown at 23, and is equipped at the lower end with a rock link 24, the leading end of this rock link being pivotally connected to the downturned crank arm 17 of the crank shaft. The upper end of the lever works in a strap guide 25 carried by the hand rail 26 of the car, and a hook 27 is attached to the hand rail and forms means for locking the lever in position to hold the step in released position.

In operation it is simply necessary to shove forwardly the operating lever 24 to the position shown in Fig. 2, to actuate the rock shaft 13 and lower the step 10 to operative position. To raise the step to released position the lever is pulled rearwardly, and the step is then locked in this position by engaging the hook 22 over the handle lever as shown in Fig. 1.

What is claimed is:—

The combination with car steps and rail thereof, of an extension step located beneath the lowermost car step, a rock shaft mounted transversely upon said car steps and having terminal slotted crank arms outside said car steps, guides carried upon said car steps, a pair of hanger links pivotally connected to said crank arms and slidably fitting within said guides, the lower ends of said links being connected to said extension step, a crank arm on said crank shaft extending in an opposite direction from the first named crank arms, an operating lever operatively connected to the last named crank arm, a guide strap carried by the said rail slidably receiving said lever, and locking means on said strap engageable with said lever for locking said lever in position to hold said step raised against the lowermost car step.

In testimony whereof, I affix my signature, in presence of two witnesses.

PHILIP M. ENGELHARDT.

Witnesses:
 L. E. JENKINS,
 FRANK E. HALES.

Copies of this patent may be obtained for five cents each, by addressing the "Commissioner of Patents, Washington, D. C."